(12) United States Patent
Kamkar-Parsi et al.

(10) Patent No.: US 11,929,071 B2
(45) Date of Patent: Mar. 12, 2024

(54) HEARING DEVICE SYSTEM AND METHOD FOR OPERATING SAME

(71) Applicant: Sivantos Pte. Ltd., Singapore (SG)

(72) Inventors: Homayoun Kamkar-Parsi, Erlangen (DE); Marko Lugger, Weilersbach (DE); Umut Goekay, Mainz (DE)

(73) Assignee: Sivantos Pte. Ltd., Singapore (SG)

( * ) Notice: Subject to any disclaimer, the term of this patent is extended or adjusted under 35 U.S.C. 154(b) by 328 days.

(21) Appl. No.: 17/502,274

(22) Filed: Oct. 15, 2021

(65) Prior Publication Data

US 2022/0122606 A1    Apr. 21, 2022

(30) Foreign Application Priority Data

Oct. 15, 2020  (DE) .................... 10 2020 213 048.5

(51) Int. Cl.
*G10L 15/22* (2006.01)
*H04R 25/00* (2006.01)

(52) U.S. Cl.
CPC ............ *G10L 15/22* (2013.01); *H04R 25/558* (2013.01); *G10L 2015/223* (2013.01)

(58) Field of Classification Search
CPC ......... G10L 15/22; G10L 15/08; H04R 25/00; H04R 25/558; H04R 2225/43; H04R 25/50; H04R 2420/07
See application file for complete search history.

(56) References Cited

U.S. PATENT DOCUMENTS

| | | | |
|---|---|---|---|
| 3,726,856 A * | 4/1973 | Sinkula | ................. C07H 17/08 536/7.4 |
| 10,356,536 B2 | 7/2019 | Petersen et al. | |
| 10,453,458 B2 | 10/2019 | Haubrich et al. | |
| 10,510,345 B2 | 12/2019 | Bhat | |
| 2019/0075406 A1* | 3/2019 | Petersen | ............. H04R 25/552 |
| 2019/0082276 A1* | 3/2019 | Crow | .................... H04R 25/50 |
| 2019/0387330 A1 | 12/2019 | Rueckerl et al. | |
| 2020/0336846 A1 | 10/2020 | Rohde et al. | |

FOREIGN PATENT DOCUMENTS

| | | |
|---|---|---|
| DE | 102018209719 A1 | 7/2019 |
| DE | 102018209822 A1 | 12/2019 |
| EP | 3148221 A1 | 3/2017 |
| EP | 3291580 A1 | 3/2018 |
| EP | 3328097 A1 | 5/2018 |
| EP | 3726856 A1 | 10/2020 |

* cited by examiner

*Primary Examiner* — Rasha S Al Aubaidi
(74) *Attorney, Agent, or Firm* — Laurence A. Greenberg; Werner H. Stemer; Ralph E. Locher

(57) ABSTRACT

A method operates a hearing device system which has a hearing aid and a peripheral device which provides a voice-controlled digital assistant. A microphone signal from the hearing aid is examined for own voice components of the wearer of the hearing aid. If own voice components are detected by the hearing aid the microphone signal is examined for a pre-defined activation command for the digital assistant. If the activation command is recognized, a portion of the microphone signal representing the activation command and a subsequent speech sequence is processed by the hearing aid for a speech recognizer of the digital assistant using an algorithm. The processed portion of the microphone signal is transmitted to the peripheral device.

10 Claims, 2 Drawing Sheets

HEARING DEVICE SYSTEM AND METHOD FOR OPERATING SAME

CROSS-REFERENCE TO RELATED APPLICATION

This application claims the priority, under 35 U.S.C. § 119, of German Patent Application DE 10 2020 213 048.5, filed Oct. 15, 2020; the prior application is herewith incorporated by reference in its entirety.

FIELD AND BACKGROUND OF THE INVENTION

The invention relates to a method for operating a hearing device system. The invention additionally relates to a hearing device system.

A hearing aid is used to treat a hearing-impaired person or person with hearing loss who wears the device—typically all or most of the time—to compensate for a hearing deficit. The hearing aid can be provided in different designs to meet the individual needs of the wearer. For example, the hearing aid is configured as a behind-the-ear ("BTE") hearing aid, as a hearing aid with an external receiver (receiver in canal "RIC"), or as an in-the-ear ("ITE") hearing aid.

The hearing aid contains at least one electroacoustic transducer, in particular a microphone, with which (airborne) sound from the environment of the wearer is captured. A corresponding signal output from the transducer is processed, in particular amplified, by a signal processing unit in relation to the needs of the wearer. The processed signal is directed to a receiver (loudspeaker) and output by the receiver into the auditory canal or to the eardrum of the wearer as sound.

The hearing aid can be linked to a digital (virtual) assistant of a peripheral device which is configured to provide (assistance) services. For this purpose, speech recognition is performed and the recognized speech or its contents are interpreted by the digital assistant.

For example, in non-prosecuted German patent application DE 10 2018 209 719 A1, a method is disclosed for operating a hearing device system. The hearing device system contains a hearing device and a virtual assistant, as well as for identifying a user of the hearing device who sends a voice command to the at least one virtual assistant. The content of the voice command is received by the at least one virtual assistant and the hearing aid transmits an information signal containing information about the presence of an enable condition to the at least one virtual assistant. In this case, the content of the voice command is executed by the at least one virtual assistant depending on the information about the existence of the enable condition.

Non-prosecuted German patent application DE 10 2018 209 822 A1 (corresponding to U.S. patent publication No. 2019/0387330) shows a method for controlling the data transmission between at least one hearing device and a peripheral device of a hearing device system. A microphone signal captured by the hearing device is automatically examined for own voice components of the hearing aid wearer, and when own voice components are detected, a subsequent audio sequence of the microphone signal is transmitted from the hearing device to the peripheral device.

SUMMARY OF THE INVENTION

The object of the invention is to specify a particularly suitable method for operating a hearing device system which contains a hearing aid and a peripheral device providing a voice-controlled digital assistant. In particular, the digital assistant is configured to avoid incorrect recognition and/or interpretation of a speech sequence. In addition, such a hearing device system and a corresponding hearing aid will be specified.

With regard to the method, the object is achieved according to the invention by the features of the independent method claim. With regard to the hearing aid, the object is achieved according to the invention by the features of the independent hearing aid claim and with regard to the hearing device system, by the features of the independent hearing device system claim. Advantageous configurations and extensions form the subject matter of the dependent claims. In these the comments in relation to the method also apply, mutatis mutandis, to the hearing device system, and vice versa.

The method is used for operating a hearing device system, which contains a hearing aid and a peripheral device. The peripheral device, which is configured, for example, as a smartphone or as a so-called smart speaker, can be coupled, and advantageously is in fact coupled, to the hearing aid for signal transmission. The peripheral device provides a voice-controlled digital assistant, also known as a virtual assistant. For example, the voice-controlled digital assistant is "Siri" by Apple, "Alexa" by Amazon, or "Google Now" for Google applications.

According to the method, a microphone signal from the hearing aid is examined, preferably automatically, for own voice components of the hearing aid wearer. In other words, the microphone signal is analyzed for the presence of the wearer's own voice. The microphone signal represents the ambient sound which was detected by a microphone of the hearing aid and converted into the microphone signal by the microphone.

This own voice detection is carried out, for example, by means of a level comparison of signals from an (ambient) microphone worn on or behind the earlap and an (ear-canal) microphone worn in the auditory canal of the wearer. Alternatively, or in addition, a spatial filter, in particular monaural or binaural beamforming, is applied to signals from the microphones of the hearing aid to detect the wearer's own voice, so that sound issuing from the wearer's mouth can be determined.

Furthermore, according to the method, if own voice components are detected the microphone signal is examined by the hearing aid, preferably automatically, for a predefined activation command of the digital assistant. This activation command is advantageously stored in a memory of the hearing aid. The hearing aid thus performs a speech recognition (word recognition) on the microphone signal. In particular, the activation command is used to activate a voice interface of the digital assistant.

If the activation command is detected, the portion of the microphone signal representing the activation command and a subsequent sequence of spoken words by the wearer is processed by the hearing aid for a speech recognizer of the digital assistant using an algorithm. In particular, the hearing aid contains a signal processing unit for this purpose. This portion of the microphone signal representing the activation command and a subsequent speech sequence of the wearer is abbreviated below as the speech signal.

The processed portion of the microphone signal is then transmitted to the peripheral device and advantageously forwarded to the digital assistant for speech recognition by the latter.

The transmission preferably takes place in the manner of a (live) "stream". If the activation command is recognized, the command and the subsequent speech sequence are recorded and transferred directly, in particular as an audio signal, i.e. as a signal with an audio format such as "wma" or "mp3", to the peripheral device.

Due to the processing by the hearing aid, it is thus advantageously possible to improve recognition of the speech by the speech recognizer of the digital assistant. In particular, in contrast to the processing of a signal for a better intelligibility by a person, or in contrast to the processing of the signal to compensate for a hearing loss of the hearing aid wearer, different algorithms, filters or parameters are used, for example, in which the processed speech signal or a similarly output sound are perceived as unpleasant and/or unusual by a person, but for a speech recognizer of the digital assistant are better suited in terms of recognition rate.

It is advantageous to process the speech signal in such a way that a recognition rate of the activation command or the subsequent speech sequence or the words therein by a speech recognizer is as high and as accurate as possible. In other words, the speech signal is adapted to the speech recognizer of the digital assistant.

According to a preferred extension, the algorithm used is adaptive. In other words, the algorithm is modifiable, in particular adaptable. Advantageously, the algorithm is adaptable and is advantageously adapted in such a way that the recognition rate of the speech recognizer of the digital assistant is increased. For this purpose, for example, a parameter, a coefficient and/or a function of the algorithm is adapted. The adaptation is carried out according to an optimization procedure, for example. For example, the algorithm contains a neural network or machine learning.

According to a preferred extension, the algorithm is and/or has been adjusted or adapted based on a training procedure, preferably with a view to increasing the recognition rate of the speech recognition of the digital assistant. For example, such a training may take place as part of a general fitting by the audiologist, in a training operating mode of the hearing aid for this purpose, or during normal operation of the hearing aid.

It is advantageous to adapt the algorithm if a detection rate is below a specified threshold value. For example, to determine the recognition rate, a response signal from the digital assistant or peripheral device is output to the hearing aid, wherein the response signal contains information regarding whether the activation command and/or the subsequent speech sequence was recognized by the speech recognizer of the digital assistant or detected with sufficient reliability.

In summary, the algorithm is particularly preferably adapted and/or adaptable to the speech recognizer of the digital assistant, in particular with a view to achieving the highest possible recognition rate of the activation command and/or the subsequent speech sequence.

According to a suitable embodiment, the algorithm comprises a spatial filter, in particular a monaural or binaural beamforming. Thus, during processing of the portion of the microphone signal representing the activation command and the subsequent speech sequence, the spatial filter is applied to this portion of the microphone signal. Thus, spatially separated sound/speech sources can be amplified or attenuated accordingly.

By means of the beamforming, interference sources are preferably suppressed, i.e. their signal intensity is reduced. In comparison to beamforming, which is used for processing a signal for output to the wearer, a comparatively "aggressive" filtering can be used here because the processed speech signal is not intended to be output to the wearer and be perceived by them as pleasant. Instead, the intention is merely to increase the recognition rate of the speech recognizer in the digital assistant. Thus, particularly preferably, those components of the speech signal that do not originate from the wearer's mouth are reduced to zero and/or a comparatively small (spatial) region is used as the wearer's mouth.

For example, the same spatial filter is used as was used for the own voice detection. Preferably, however, another spatial filter is used which does not modify the own voice components of the speech signal and reduces the other components of the speech signal, preferably to zero.

According to a suitable embodiment, the algorithm comprises a noise filter. This reduces the noise in the speech signal, that is, the portion of the microphone signal representing the activation command and a subsequent speech sequence by the wearer, as a function of the signal-to-noise ratio of the speech signal. In summary, the noise filter is applied to the speech signal during processing of the speech signal.

In particular, the size of the noise reduction, i.e. the value of the attenuation of the noise, is adjusted or adapted by a training procedure completed in advance, for example by the acoustician as part of a general fitting of the hearing aid. Additionally, or alternatively, the size of the noise reduction can be adjusted by means of a (further) training procedure.

According to a suitable embodiment of the method, the algorithm contains a spectral filter which modifies the spectral components of the speech signal, in particular selectively. In a suitable manner, the spectral filter reduces the components of the speech signal in a frequency range for low frequencies, in particular for frequencies less than 500 Hz or less than 200 Hz. In the process, these components can even be reduced to zero, thus removing these components from the speech signal. Alternatively or in addition to this, the components of the speech signal in a frequency range for high frequencies, in particular for frequencies greater than 4 kHz, i.e. in the range of the fricatives and the consonants, are suitably amplified by means of the spectral filter.

The spectral filter can be used to increase the ability to recognize the activation command and/or the subsequent speech sequence, in particular at a comparatively low signal-to-noise ratio.

For example, in the course of a training procedure, the frequency ranges in which the components of the speech signal are reduced at low frequencies and/or the components of the speech signal are amplified at high frequencies are adapted. In addition, or alternatively, the value of the attenuation or gain can be adjusted during the training.

The spatial filter, the noise filter, and/or the spectral filter preferably processes the speech signal exclusively in the frequency domain.

In accordance with a suitable embodiment of the method, during the processing of the speech signal, speech recognition is performed by means of the hearing aid, in particular by means of its speech recognition unit. After a word is recognized, advantageously after each word of the activation command and/or the speech sequence is recognized, a (word) segmentation signal, in particular a zero signal, is inserted at the appropriate position of the speech signal. Thus, the words of the activation command and/or the speech sequence are separated from each other.

This facilitates the recognition of the words of the activation command and/or the speech sequence by means of the speech recognizer of the digital assistant, even if the pronunciation is unclear.

According to a suitable embodiment of the method, an error signal is transmitted to the hearing aid from the peripheral device, in particular from the digital assistant, if the speech recognizer of the peripheral device or the digital assistant does not recognize the activation command and/or the subsequent speech sequence, or not sufficiently reliably. In this case, the speech signal is reprocessed using the algorithm after the algorithm has been modified. In particular—in a similar way to a training procedure—a parameter, a coefficient and/or a function of the algorithm is adjusted. The adjustment is made, for example, according to an optimization method that targets the detection rate.

Furthermore, it is provided that the reprocessed speech signal is transmitted to the peripheral device and from there to the digital assistant for speech recognition. Thus, it is advantageously possible for the activation command and the subsequent speech sequence to be re-analyzed by the speech recognizer of the digital assistant without the hearing aid wearer needing to repeat the activation command or the speech sequence.

The reprocessing with a modified algorithm and the re-transmission are preferably carried out automatically. In either case, the convenience of the hearing aid holder is advantageously increased.

According to the invention, a hearing aid for a hearing device system comprises at least one microphone by which sound can be captured from the environment of the hearing aid and a microphone signal corresponding to that sound can be generated.

Furthermore, the hearing aid contains both an own voice detection unit for examining the microphone signal for own voice components of the hearing aid wearer, which unit is linked to the microphone for signal transmission, and a first speech recognition unit which is used to examine the microphone signal for a predefined activation command of a voice-controlled digital assistant of an associated peripheral device.

The hearing aid additionally contains a signal processing unit which provides algorithms for processing the speech signal. The signal processing unit is configured in such a way that the portion of the microphone signal representing the activation command and a subsequent speech sequence, i.e. the speech signal, is processed using the algorithm if the predefined activation command of the digital assistant is recognized. In particular, the algorithm is adapted and/or can be adapted to the digital assistant or to the speech recognizer of the digital assistant. Advantageously, the signal processing unit is coupled to the own voice detection unit and/or to the first speech recognition unit for signal transmission.

The hearing aid contains a first transmission unit for transmitting the processed portion of the microphone signal to the peripheral device. This is preferably configured for wireless transmission or radio transmission, for example via Bluetooth or Bluetooth LE (Bluetooth Low Energy).

According to the invention, a hearing device system, which can be operated or is operated according to the method in one of the variants described above, contains at least one hearing aid. For example, the hearing aid system contains a second hearing aid for the wearer for binaural hearing, wherein the two hearing aids can be coupled to each other for signal transmission and advantageously are in fact coupled to each other.

The hearing device system additionally contains the peripheral device with the voice-controlled digital assistant. The peripheral device contains a second transmission unit for receiving the portion of the microphone signal transmitted by the hearing aid. In addition, or alternatively, the second transmission unit is used to transmit a response signal, for example an audio signal for outputting a sound from a receiver (loudspeaker) of the hearing aid and/or an error signal to the hearing aid if the activation command and/or the subsequent speech sequence were not detected or not sufficiently reliably detected by the speech recognizer using the peripheral device. For the speech recognition of the activation command and/or the speech sequence, the peripheral contains a second speech recognition unit which is coupled to the digital assistant, in particular activated and/or used by the digital assistant.

Other features which are considered as characteristic for the invention are set forth in the appended claims.

Although the invention is illustrated and described herein as embodied in a hearing device system and a method for operating same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Equivalent parts and dimensions are provided with identical reference signs in all figures.

Figure 1:
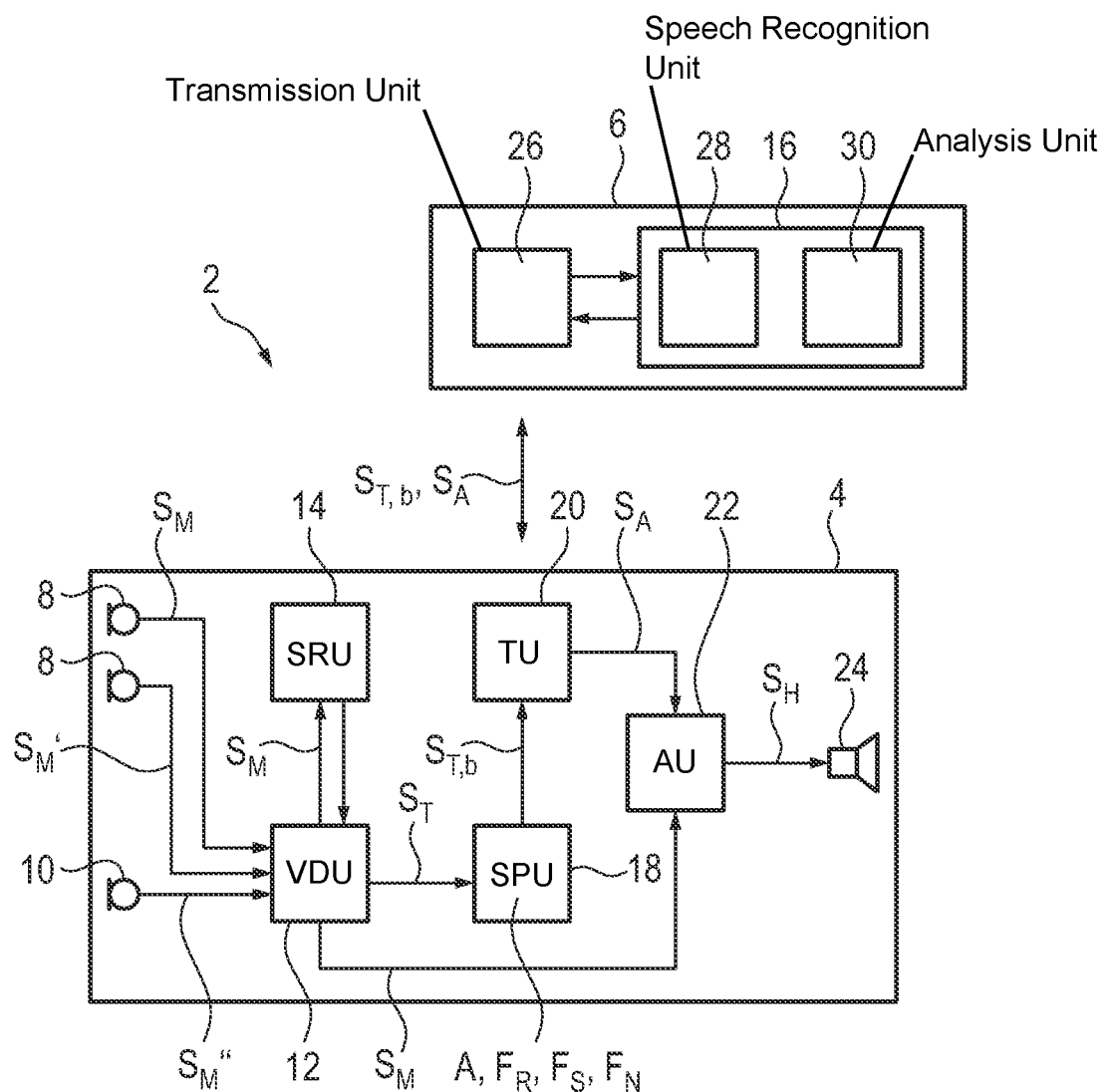
FIG. 1 is a schematic diagram of a hearing device system having a hearing aid as well as a peripheral device which provides a voice-controlled digital assistant.

Referring now to the figures of the drawings in detail and first, particularly to FIG. 1 thereof, there is shown a hearing device system 2 which contains a hearing aid 4 and a peripheral device 6. The hearing aid contains two ambient microphones 8 that can be used to detect sound from the environment of the wearer of the hearing aid 4. In addition, the hearing aid 2 contains an ear-canal microphone 10, which is used to capture sound in the auditory canal of the wearer.

The ambient microphone 8 and the ear-canal microphone 10 are both electroacoustic transducers. These convert the sound captured in the environment of the wearer, also referred to for short as ambient sound, or the sound captured in the auditory canal 8, also abbreviated to auditory canal sound, into an electrical microphone signal $S_M$, $S_M'$ or $S_M''$. The microphone signals $S_M$, $S_M'$ or $S_M''$ can be output to an own voice detection unit 12. For this purpose, the microphones 8 and 10 are connected to the own voice detection unit 12 for signal transmission.

The own voice detection unit 12 is configured to perform own voice detection. In other words, using the own voice detection unit 12, at least one of the microphone signals $S_M$, $S_M'$, $S_M''$ or a signal derived from them is analyzed for the presence of the wearer's own voice, for example by using a suitable filter or a level comparison.

In FIG. 1 and in the following, for the sake of clarity only the microphone signal $S_M$ is referred to. The following comments apply analogously to the microphone signal $S_M'$ and $S_M''$ or to a signal derived from them.

In addition, the hearing aid 4 contains a first (word recognition unit) speech recognition unit 14 coupled to the own voice detection unit 12 for signal transmission, to allow the microphone signal SM to be examined (analyzed) for a pre-defined activation command of the voice-controlled digital assistant 16 of an associated peripheral device 6. The activation command is stored on a memory of the hearing aid 4, which is not discussed further.

For processing the microphone signal $S_M$ or a portion $S_T$ thereof, the hearing aid 4 comprises a signal processing unit 18 coupled to the speech recognition unit 12. This provides an algorithm A for processing the microphone signal $S_M$ or the portion $S_T$ thereof. The signal processing unit 18 is configured in such a way that the portion $S_T$ of the microphone signal $S_M$ representing the activation command and a subsequent speech sequence is processed using the algorithm A if the predefined activation command of the digital assistant 16 is recognized. This portion $S_T$ of the microphone signal is also designated below as the speech signal $S_T$.

The hearing aid contains a first transmission unit 20 for the wireless transmission of the processed speech signal $S_{T,b}$ to the peripheral device 6. For this purpose, the first transmission unit is coupled to the signal processing unit 18.

The first transmission unit 20 together with the own voice detection unit 12 is also coupled to an amplification unit 22 for signal transmission, which processes and amplifies an audio signal received from the first transmission unit 20 or the microphone signal $S_M$ or the microphone signal $S_M$ processed by the own voice detection unit 12 for own voice detection according to a hearing deficit of the wearer and outputs a corresponding receiver signal $S_H$ to a receiver 24, in this case a micro-speaker, which is also inserted in the auditory canal of the wearer. The receiver 24 converts the receiver signal into sound and outputs it into the wearer's auditory canal. The amplification unit 22 is integrated into the signal processing unit 18 according to an alternative not described further.

The hearing device system 2 shown in FIG. 1 also contains the peripheral device 6. This comprises a second transmission unit 26 for receiving the processed speech signal $S_{T,b}$ transmitted by the hearing aid 4 and/or for transmitting a response signal $S_A$, for example the audio signal or an error signal, to the hearing aid 4.

The peripheral device provides a voice-controlled digital assistant 16. The latter controls and/or uses a second speech recognition unit 28 of the peripheral device 6, coupled to the second transmission unit 26 for signal transmission, to perform speech recognition on the transmitted processed speech signal $S_{T,b}$, and an analysis unit 30 coupled to the second speech recognition unit 28 to analyze the words or the word sequence recognized by the second speech recognition unit 28.

Figure 2:
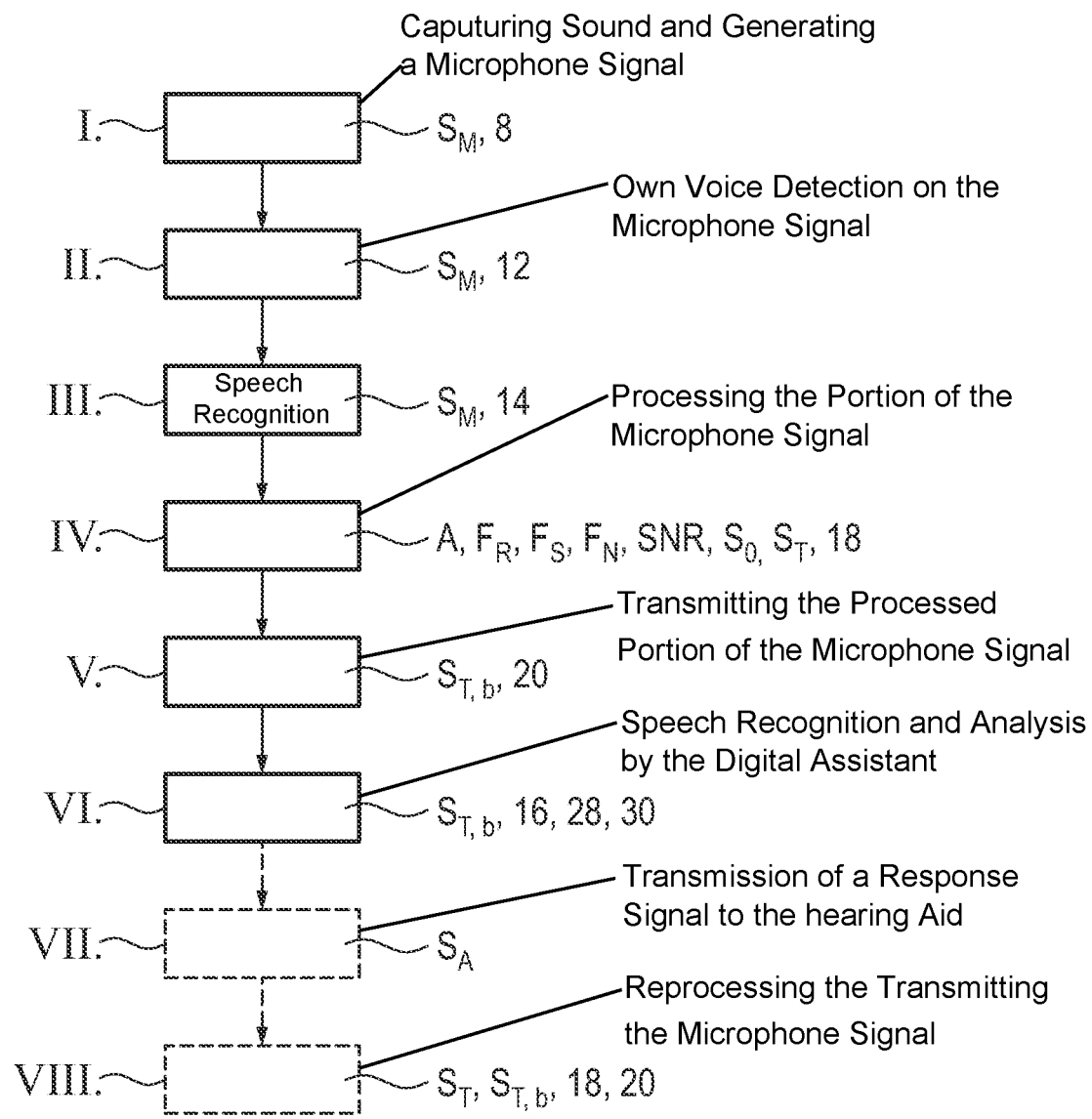
FIG. 2 is a flow chart depicting a method sequence for an operation of the hearing device system, wherein the portion of a microphone signal representing an activation command of the digital assistant and a subsequent speech sequence is processed by the hearing aid, and wherein this processed portion is transmitted to the digital assistant of the peripheral device.

FIG. 2 shows a method for operating the hearing device system 2. In a first step I., sound is captured by the ambient microphone 8 and converted into a microphone signal $S_M$ representing this sound. This is output to the own voice detection unit 12. In a second step II., this performs own voice detection on the microphone signal $S_M$.

If the voice of the wearer of the hearing aid 4 was detected in step II., in a third step III. the microphone signal SM is analyzed using the first speech recognition unit 14 of the hearing aid 4 for the presence of the activation command of the digital assistant 16, which is stored in the memory of the hearing aid. Here, a word or a word sequence which was determined as the result of this analysis is compared with the stored activation command.

If the activation command has been recognized, i.e. the determined words or the determined word sequence matches the stored activation command, in a fourth step IV. the microphone signal $S_M$, more precisely the portion $S_T$ of the microphone signal $S_M$ representing the activation command and an immediately following speech sequence (word sequence), is processed using the algorithm A.

The algorithm A contains a spatial filter $F_R$, which is designed as a monaural or binaural beamforming, to separate the voice of the wearer of the hearing aid 4 from other sources of noise or speech. In this case, the own voice components of the speech signal $S_T$ detected by the filter $F_R$ are not modified, and the other components of the speech signal $S_T$ are reduced to zero.

In addition, or alternatively, the algorithm A contains a noise filter $F_N$ which reduces noise in the speech signal $S_T$. The magnitude of the reduction depends on a signal-to-noise ratio SNR of the speech signal ST, wherein the lower the signal-to-noise ratio SNR the greater the reduction.

Additionally, or alternatively, the algorithm contains a spectral filter $F_S$ which reduces (attenuates) those components of the speech signal $S_T$ corresponding to frequencies below 5 kHz. In addition, those components of the speech signal $S_T$ corresponding to frequencies above 10 kHz are amplified by means of the spectral filter $F_S$.

In summary, during processing of the speech signal $S_T$ the spatial filter $F_R$, the noise filter $F_N$, and/or the spectral filter $F_S$ are applied to this $S_T$.

In addition to or as an alternative to the filters $F_R$, $F_N$, $F_S$, during processing of the speech signal $S_T$, speech recognition is performed on the speech signal $S_T$ using the first speech recognition unit 14. After each recognized word of the activation command and/or of the speech sequence of the speech signal $S_T$, a segmentation signal $S_0$ is inserted at the corresponding position of the speech signal $S_T$. This segmentation signal $S_0$ represents, for example, silence, i.e. the absence of sound. This segmentation signal S0 is used to separate the words of the activation command and/or the speech sequence from one another.

The algorithm A, in particular its filters $F_R$, $F_N$, $F_S$ and/or the segmentation signal $S_0$, for example its (signal) length, were adjusted by the digital assistant 16 based on a training procedure completed in advance, with a view to achieving the highest possible recognition rate for the speech recognition. This is carried out, for example, in the course of a fitting during the hearing device training, or in a training operating mode intended for training. In addition, the algorithm A is trained during operation, in particular also in normal operation, of the hearing device system 2 by means of a response signal $S_A$ (see FIG. 2) if the speech recognition and/or the analysis of the processed speech signal $S_{T,b}$ by the digital assistant 16 is not successful.

In summary, the algorithm is adaptive and is and will be adapted to the speech recognizer of the digital assistant 16 using a training procedure.

For example, in the course of the training, the value for the attenuation of noise in the noise filter $F_N$ is adapted. In the case of the spectral filter $F_S$, for example, the frequency ranges for a reduction of the components of the speech signal and/or for the amplification of the components of the speech signal and/or a value for the reduction or the amplification are adapted. In addition, in the case of the spatial filter, for example, a value of the reduction of noise interference is adapted in the course of the training, wherein noise interference is understood to mean sounds or speech which does not originate from a region assigned to the mouth of the wearer. Alternatively, or additionally, the region assigned to the mouth can be adapted.

Then, in a fifth step V., the speech signal $S_{T,b}$ processed in this way, i.e. the processed portion $S_{T,b}$ of the microphone signal $S_M$ representing the activation command and an immediately following speech sequence, is transmitted from the hearing aid unit 4 to the peripheral device 6 using the first transmission unit 20 and the second transmission unit 26.

In step VI., the processed speech signal $S_{T,b}$ transmitted to the peripheral device 6 is analyzed using a speech recognizer of the digital assistant 16, for which the second speech recognition unit 28 is used. In addition, in step VI., the word sequence recognized in this way, which contains the activation command and the subsequent speech sequence, is analyzed and interpreted by the digital assistant 16 with regard to the content of the word sequence using the analysis unit 30. If another command is detected in the speech sequence after the activation command, this is executed by the digital assistant 16. In this case, if appropriate, an audio signal is transmitted to the hearing aid 4 as a response signal $S_A$ in step VII., this signal being processed by the amplifier unit 22 and output by means of the receiver as sound.

However, if the activation command and/or the subsequent speech sequence is not recognized by the digital assistant using the speech recognizer, or if no further command can be determined by the interpretation by the analysis unit, in step VII. an error signal is transmitted to the hearing aid 4 as response signal $S_A$. In FIG. 2, the method steps VII. and VIII. for this case are shown by dashed lines. In this case, the previously processed speech signal $S_T$ transmitted to the peripheral device is automatically reprocessed in step VIII., wherein the algorithm has been changed for the processing. The algorithm was adjusted and trained using an optimization method, the optimization method being configured to increase the recognition rate of the word sequence of the speech signal $S_T$ by the speech recognizer of the digital assistant. The reprocessed signal $S_{T,b}$ is also retransmitted to the peripheral device 6 in step VIII. for speech recognition and analysis by the digital assistant 16.

The invention is not limited to the exemplary embodiments described above. Instead, other variants of the invention can also be derived from them by the person skilled in the art, without departing from the subject-matter of the invention. In particular, all individual features described in connection with the exemplary embodiments can also be combined together in different ways without departing from the subject matter of the invention.

The following is a summary list of reference numerals and the corresponding structure used in the above description of the invention:

2 hearing device system
4 hearing aid
6 peripheral device
8 (ambient) microphone
10 (ear-canal) microphone
12 own voice detection unit
14 hearing aid speech recognition unit
16 digital assistant
18 hearing aid signal processing unit
20 hearing aid transmission unit
22 amplification unit
24 receiver
26 peripheral device transmission unit
28 peripheral device speech recognition unit
30 analysis unit
A algorithm
$F_N$ noise filter
$F_R$ spatial filter
$F_S$ spectral filter
$S_A$ response signal
$S_b$ processed portion of the microphone signal
$S_H$ receiver signal
$S_M$ microphone signal
$S_T$ portion of the microphone signal
$S_{T,b}$ processed portion of the microphone signal
$S_O$ segmentation signal
SNR signal-to-noise ratio
I. Capturing sound and generating a microphone signal
II. Own voice detection on the microphone signal
III. Speech recognition
IV. Processing the portion of the microphone signal
V. Transmitting the processed portion of the microphone signal
VI. Speech recognition and analysis by the digital assistant
VII. Transmission of a response signal to the hearing aid
VIII. Reprocessing and transmitting the microphone signal

The invention claimed is:

1. A method for operating a hearing aid system having a hearing aid and a peripheral device with a voice-controlled digital assistant, which comprises the steps of:
examining a microphone signal from the hearing aid for a presence of a wearer's own voice from own voice components of the wearer of the hearing aid;
examining the microphone signal for a predefined activation command from the voice-controlled digital assistant if the own voice components are detected by the hearing aid;
processing a portion of the microphone signal representing the predefined activation command and a subsequent speech sequence by the hearing aid for a speech recognizer of the voice-controlled digital assistant using an algorithm if the predefined activation command is recognized, and carrying out speech recognition by means of the hearing aid, wherein after a word of the predefined activation command and/or the subsequent speech sequence is recognized, a segmentation signal is inserted at a corresponding position of the portion of the microphone signal; and
transmitting a processed portion of the microphone signal to the peripheral device.

2. The method according to claim 1, wherein the algorithm is adaptive.

3. The method according to claim 1, wherein the algorithm is and/or has been adjusted based on a training procedure.

4. The method according to claim 1, wherein the algorithm has a spatial filter.

5. The method according to claim 1, wherein the algorithm includes a noise filter which reduces noise in the portion of the microphone signal in dependence on a signal-to-noise ratio of the portion.

6. The method according to claim 1, wherein the algorithm contains a spectral filter which modifies spectral components of the portion of the microphone signal.

7. The method according to claim 6, wherein the portion of the microphone signal is attenuated in a frequency range for low frequencies, and/or the portion of the microphone signal is amplified in a frequency range for high frequencies.

8. The method according to claim 1, which further comprises:
   transmitting a response signal formed as an error signal from the peripheral device to the hearing aid if the speech recognizer of the peripheral device does not recognize the predefined activation command and/or the subsequent speech sequence;
   reprocessing the portion of the microphone signal with a modified algorithm; and
   transmitting a reprocessed portion of the microphone signal to the peripheral device.

9. A hearing aid for a hearing device system, the hearing aid comprising:
   at least one microphone for generating a microphone signal;
   an own voice detection unit for examining the microphone signal for own voice components of a wearer of the hearing aid;
   a first speech recognizer for examining the microphone signal for a predefined activation command of a voice-controlled digital assistant of a peripheral device;
   a signal processor providing an algorithm and being configured in such a way that if the predefined activation command is recognized, a portion of the microphone signal representing the predefined activation command and a subsequent speech sequence is processed using the algorithm for a speech recognizer of the voice-controlled digital assistant, and carrying out speech recognition by said first speech recognizer, wherein after a word of the predefined activation command and/or the subsequent speech sequence is recognized, a segmentation signal is inserted at a corresponding position of the portion of the microphone signal; and
   a first transmission unit for transmitting a processed portion of the microphone signal to the peripheral device.

10. A hearing device system, comprising:
    said hearing aid according to claim 9;
    said peripheral device with said voice-controlled digital assistant, wherein said peripheral device having a second transmission unit for receiving the portion of the microphone signal transmitted and processed by said hearing aid and/or for transmitting a response signal to said hearing aid, and a second speech recognizer for speech recognition of the predefined activation command and/or the subsequent speech sequence;
    the hearing device system configured to:
       examine the microphone signal from said hearing aid for a presence of the wearer's own voice from the own voice components of the wearer of said hearing aid;
       examine the microphone signal for the predefined activation command from said voice-controlled digital assistant if the own voice components are detected by said hearing aid;
       process the portion of the microphone signal representing the predefined activation command and the subsequent speech sequence by said hearing aid for a speech recognizer of said voice-controlled digital assistant using an algorithm if the predefined activation command is recognized; and
       transmit the processed portion of the microphone signal to said peripheral device.

* * * * *